(No Model.)

A. SPENCER & L. B. KITCHEL.
ROAD CART.

No. 456,386. Patented July 21, 1891.

WITNESSES:
C. L. Bendixon
H. M. Seamans

INVENTORS
Abel Spencer
Lyman B. Kitchel
By Duell, Leaser & Duell
ATTORNEYS.

UNITED STATES PATENT OFFICE.

ABEL SPENCER AND LYMAN B. KITCHEL, OF PENN YAN, NEW YORK.

ROAD-CART.

SPECIFICATION forming part of Letters Patent No. 456,386, dated July 21, 1891.

Application filed April 11, 1891. Serial No. 388,533. (No model.)

*To all whom it may concern:*

Be it known that we, ABEL SPENCER and LYMAN B. KITCHEL, of Penn Yan, in the county of Yates, in the State of New York, have invented new and useful Improvements in Road-Carts, of which the following, taken in connection with the accompanying drawings, is a full, clear, and exact description.

This invention consists in a novel construction of a road-cart in which simplicity is combined with stability, ease to the rider of the cart, and convenience of readily removing the foot-rest when desired.

The invention is fully illustrated in the annexed drawings, in which—

Figure 1:
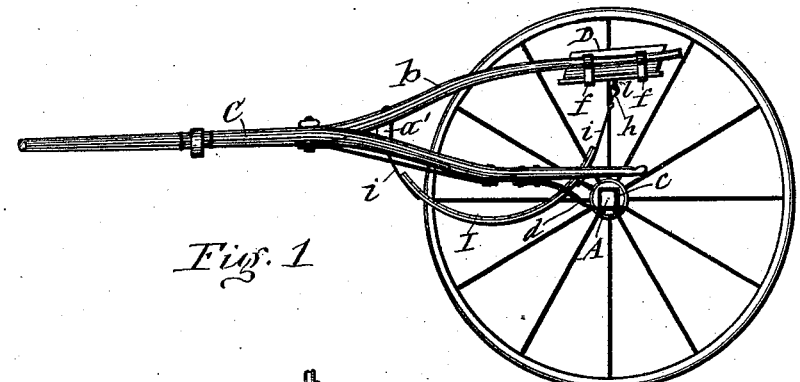
Figure 2:
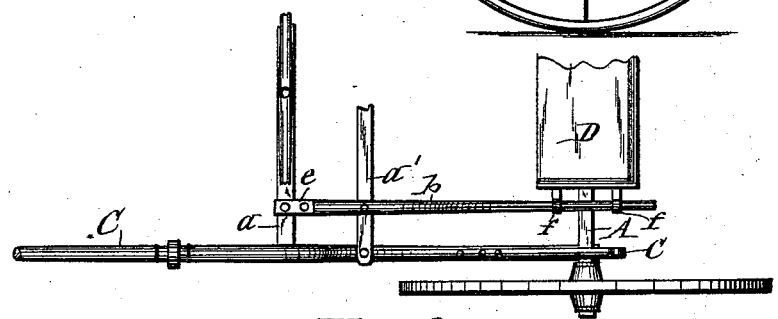
Figure 3:
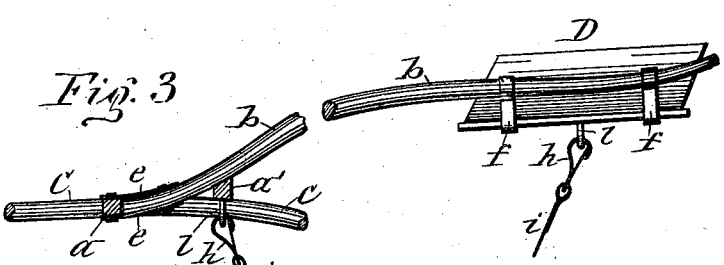
Figure 4:
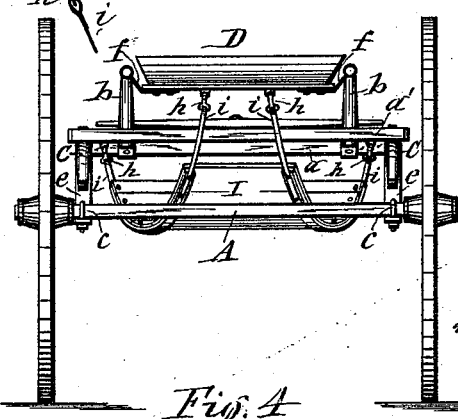

Figure 1 is a side elevation taken immediately inside of the near wheel of a road-cart embodying our improvements. Fig. 2 is a plan view of one side of the cart. Fig. 3 is an enlarged detail view of the connection of the foot-rest to the cart, and Fig. 4 is a rear end view of said cart.

Similar letters of reference indicate corresponding parts.

A represents the axle of the vehicle, and C the thills, the rear ends of which extend across the top of the axle and remote therefrom to prevent contact and rattling. We connect the thills to the axle vertically elastic by means of leaf-springs $d\ d$, secured at one end to the under side of the thills in front of the axle and attached at the opposite end to the axle by clips $c\ c$.

D denotes the seat, which we support on the free ends of the longitudinal wooden spring-bars $b\ b$, secured at one end to the thills, which are provided with two cross-bars $a\ a'$, one a short distance back of the other. The spring-bars $b\ b$ have their front ends immediately back of the front cross-bar $a$ and are attached thereto by means of metal straps $e\ e$, fastened to the top and bottom of said cross-bar and adjacent ends of the spring-bars, as shown in Fig. 3 of the drawings. Said spring-bars extend rearward and ride upon the second cross-bar $a'$. The free ends of the spring-bars are over the axle and free therefrom and have suspended from them straps $f f$, of leather or other suitable flexible material, on which straps the seat D is hung, and thus supported free from the thills and axle and allowed to oscillate laterally independent of the spring-bars, thereby relieving the seat from lateral jars imparted to the spring-bars.

I represents the foot-rest, which we detachably connect to the thills and to the seat by means of snap-hooks $h\ h$, secured to leather straps $i\ i$ on the ends of the foot-rest and hooked onto staples $l\ l$, attached to the cross-bar $a'$ and under side of the seat, as shown more clearly in Fig. 3 of the drawings. Said snap-hooks allow the foot-rest to be readily removed from the cart, when desired, to use the cart as a speeding sulky.

What we claim as our invention is—

1. The combination of the thills connected vertically elastic to the axle, the longitudinal spring-bars $b\ b$, rigidly secured at their front ends to the thills and extending with their rear ends over the axle and free therefrom, and flexible straps $f f$, suspending the seat from the free ends of the spring-bars and free from the thills and axle, substantially as described and shown.

2. In combination with the thills connected vertically elastic to the axle, spring-bars $b\ b$, secured to the thills and extending over the axle and free therefrom, and the seat suspended from the free ends of the spring-bars by flexible straps $f f$, as shown, the foot-rest I, detachably connected at opposite ends, respectively, to the cross-bar of the thills and to the under side of the seat, as set forth.

In testimony whereof we have hereunto signed our names this 6th day of April, 1891.

ABEL SPENCER. [L. S.]
  LYMAN B. KITCHEL. [L. S.]

Witnesses:
 FRANK CAREY,
 FRANK SUZEY.